United States Patent Office 3,652,661
Patented Mar. 28, 1972

3,652,661
9,9-BIS-AMINO ALKYL FLUORENE SULPHONIC ACIDS AND METAL SALTS THEREOF
John Ewart Lodge, Pontypool, England, assignor to Imperial Chemical Industries Limited, London, England
No Drawing. Filed Feb. 5, 1968, Ser. No. 702,784
Int. Cl. C07c *143/56*
U.S. Cl. 260—510                                6 Claims

ABSTRACT OF THE DISCLOSURE

Polyamides containing sulphofluorene links to accept basic dyestuffs (not acid) for single stage pattern dyeing.

---

This invention relates to the manufacture of synthetic linear polymers and more particularly to synthetic linear copolyamides containing fluorene sulphonic acid residues in the carbon chain, and to shaped articles made therefrom.

High molecular weight synthetic linear polyamides, by which is meant polyamides of sufficiently high molecular weight to be capable of being melt spun, having long been known and some are manufactured on a large scale for melt-spinning into filaments by the polycondensation of low molecular weight diamines and dicarboxylic acids or of aminocarboxylic acids. For example, polyhexamethylene adipamide may be made by the condensation of hexamethylene diamine and adipic acid. A similar polyamide is obtainable by the polycondensation of omega-aminocaproic acid. In place of the latter the corresponding lactam, namely epsilon-caprolactam can be polymerised so as to afford a polyamide.

Such polyamides e.g. polyhexamethylene adipamide, may be melt-spun into filaments having many attractive textile properties including a high tenacity and resistance to abrasion. The filaments are commonly dyed by acid dyestuffs but basic dyestuffs can also be used though in the case of the latter it is desirable to select those possessing good fastness to light.

Much attention has been paid particularly in recent years to the problem of modifying polyamides so as to increase or decrease their dyeability, i.e. the depth of shade obtained with a given dyestuff under given conditions. The reason for the interest in this problem is as follows. If a fabric is knitted or woven or otherwise fabricated of two or more polyamides of different dyeabilities, a pattern can immediately be obtained by a single dyeing operation, which constitutes an attractive commercial proposition.

Whilst polyamides can be modified for the above purpose by the physical application or incorporation of suitable agents it is preferable that the latter be built into the polyamide chain, i.e. chemically combined therewith because more permanent effects are thereby obtained. For example, if bifunctional compounds capable of taking part in the polyamide polycondensation nad bearing, say, sulphonic acid groups, are included in the starting materials used in the manufacture of the polyamide they will form part of the linear polyamide chain and the additional sulphonic acid groups will increase the dyeability of the resulting polyamide with respect to basic dyestuffs whilst reducing the uptake of acid dyestuffs. Suitable bifunctional compounds for taking part in the aforesaid condensation reaction have, for instance, a plurality (especially two) or amino and/or carboxyl groups. Thus diamino aromatic sulphonates can be used to give polyamides dyeing more deeply with basic dyestuffs.

It has now been found that metal salts of the hitherto undisclosed sulpho-bis 9,9-aminoalkylfluorenes are very useful for this purpose. The alkyl group may be gamma-amino-n-propyl, methyl, ethyl, isobutyl or stearyl. Instead of the amino groups functionally equivalent groups, e.g. the formylamino group may be employed.

Accordingly, therefore, from one aspect the present invention provides, as novel compounds, sulpho 9,9-bis-aminoalkylfluorenes.

The metal salts are of monovalent metals e.g. sodium, potassium or of basic organic salts of a divalent metal e.g. calcium benzoate, calcium acetate, zinc acetate, strontium formate and stannous valerate.

According to another aspect the invention provides monovalent metal or basic organic divalent metal salts of the sulpho-9,9-bisaminoalkylfluorene compounds referred to above.

Examples of the sulpho-bis aminoalkylfluorenes of this invention are disodium 9,9 - bis-beta-aminoethylfluorene-2,7-disulphonate
sodium 9,9-bis-beta-aminoethylfluorene-2-sulphonate
potassium 9,9-bis-beta-aminoethylfluorene-2-sulphonate
lithium 9,9-bis-gamma-aminopropylfluorene-2-sulphonate
sodium 9,9-bis-delta-aminobutylfluorene-2-sulphonate
2-benzoyloxybariumsulpho-9,9-bis-beta-aminoethylfluorene
2,7-bis-acetoxybariumsulpho-9,9-bis-beta-aminoethylfluorene
2,7-bis-hexanoyloxymagnesiumsulpho-9,9-bis-delta-aminobutylfluorene According to a further aspect the present invention provides synthetic linear copolyamides derived from an equimolecular mixture of an aliphatic alpha omega-diamine or cyclo aliphatic diamine having from 4 to 20 carbon atoms and an aliphatic alpha, omega-dicarboxylic acid having from six to twenty-two carbon atoms, and/or an aliphatic omega-aminocarboxylic acid containing from five to twenty-one carbon atoms, or polyamide forming functional equivalents thereof and a 9,9-bis-omega-aminoalkylfluorene mono or di-sulphonic acid or a polyamide-forming functional derivative thereof together with approximately an equal molecular proportion of an aliphatic alpha, omega-dicarboxylic acid having from six to twenty-two carbon atoms, the said fluorene derivative being present in a molecular proportion with respect to the foregoing acids of from ¼ to 10%.

The fluorene intermediate may be added to the reagents or melt before, during or after the polyamide polymerisation of polycondensation and should be employed in a molecular proportion not exceeding 10% so that not more than 10% of the repeating amide units contain fluorene nuclei. In other words the number of moles of the fluorene intermediate used must not exceed ⅒ the number of moles of dicarboxylic acid or amino-carboxylic acid employed in making the polyamide. Not less than ¼ mol. percent of the fluorene compound should be used and the preferred proportion is ½–5 mol. percent.

According to yet a further aspect, therefore, this invention comprises a process for the manufacture of synthetic linear copolyamides by heating, to effect polymerisation, an approximately, equimolecular mixture of an aliphatic alpha, omega-diamine or cyclo aliphatic diamine having from four to twenty carbon atoms and an aliphatic alpha, omega-dicarboxylic acid having from six to twenty-two carbon atoms, and/or an aliphatic omega-aminocarboxylic acid containing from five to twenty-one carbon atoms, or instead of said monomer a polyamide-forming functional equivalent thereof together with a molecular proportion with respect to the foregoing acids of from ¼ to 10% of the monovalent metal or divalent basic organic salt of a 9,9-bis-omega-aminoalkylfluorene mono- or di-sulphonic acid or a polyamide-forming functional derivative thereof, added at any stage of the polymerisation and accompanied by approximately the same molecular quantity of an aliphatic alpha, omega-dicarboxylic acid from six to twenty-two carbon atoms.

Examples of the aliphatic diamines and cycloaliphatic diamines are:

Hexamethylene diamine
3-methylhexamethylene diamine
Tetramethylene diamine
Decamethylene diamine
Octamethylene diamine
1:6-diamino-6-methylheptane
Bis (p-aminocyclohexyl) methane Examples of the aliphatic dicarboxylic acids are:

Adipic acid
Beta-methyladipic acid
Sebacic acid
Pimelic acid
Hexadecamethylene dicarboxylic acid Suitable sulpho-bis-aminoalkylfluorenes are those hereinbefore referred to.

In place of the approximately equi-molecular mixture of the aliphatic diamine and dicarboxylic acid, there may conveniently be employed polyamide-forming functional derivatives such as the diamine-dicarboxylic acid salt derived therefrom, e.g. hexamethylene diammonium adipate (derived from hexamethylene diamine and adipic acid). Thus, for instance, a copolyamide according to the invention may be made by heating together 78.6 parts by weight of hexamethylene diammonium adipate and 3.2 part by weight of sodium 9,9-bis-beta-ammoniumethyl-fluorene-2-sulphonate adipate (i.e. 2 molar percent). As already mentioned the starting materials used in making the present copolyamides may be brought together in any desired order. If the salts are employed, as just mentioned, the fluorene salt can be added to the hexamethylene diammonium adipate and the two heated together either in an autoclave or a continuous polymerisation apparatus in order to effect polymerisation, or the fluorene salt can be added to the reaction mixture during the polymerisation of the hexamethylene diammonium adipate; alternatively the two salts can be polymerised separately by heating, and the resulting polyamides then heated together in order to bring about amide interchange and thus produce the required copolyamide. Thus a copolyamide can be made by (1) first polymerising e.g. over 10% of the fluorene salt monomer with, say, hexamethylene diammonium adipate, (2) separately polymerising a further proportion of hexamethylene diammonium adipate to produce polyhexamethylene adipamide and (3) heating the two polymers together to effect interaction (amide interchange) whereby a copolyamide is obtained similar to that which would have resulted if all the hexamethylene diammonium adipate had been heated with the fluorene salt monomer in one polymerisation. Other salts which may be used in conjunction with the latter starting material are:

Hexamethylene diammonium sebacate
Octamethylene diammonium adipate
Pentamethylene diammonium sebacate
Dodecamethylene diammonium adipate If desired, the diamines may be used in the form of their N-formyl derivatives or other functional polyamide-forming derivatives; also the acids may be employed in the form of their ethyl esters for example.

Likewise instead of the amino-carboxylic acids the chemically equivalent lactams derived therefrom may be employed. Examples of suitable amino-carboxylic acids and lactams are:

Epsilon-aminocaproic acid
Epsilon-caprolactam
Omega-aminoundecanoic acid
Omega-aminoheptanoic acid More than one of the aforesaid starting materials, namely, diamines, dicarboxylic acids or amino-carboxylic acids or their chemical equivalents, may be employed.

Amongst the reagents employed in making the present polyamides there may be included monofunctional compounds in small quantity, notably monoamines or monobasic acids, e.g. acetic acid, in order to prevent polymerisation proceeding beyond the desired degree at elevated temperatures, for example, when the polyamide is held molten for the purpose of melt-spinning it into filaments. Such monofunctional compounds are known as viscosity stabilisers. In the case of the manufacture of a polyamide from a diamine and a dicarboxylic it is also possible to control the degree of polymerisation by employing a suitable excess of the diamine or of the dicarboxylic acid. Other adjuvants may also be incorporated in the polyamides at any convenient stage of their manufacture, for instance: Dyestuffs, pigments, dyestuff-formers, plasticisers, illustrants, resins.

In the following examples which are by way of illustrating not limiting the invention the parts are parts by weight.

EXAMPLE 1

200 parts of 9,9-di(3'-aminopropyl)-fluorene dihydrochloride are added during 1 hour with stirring to 375 parts of 98% sulphuric acid. The solution obtained is stirred at 100° C. for 4 hours, and then poured into 1,000 parts of methanol. The white precipitate of 9,9-di(3'-aminopropyl)-fluorene 2,7-disulphonic acid is filtered off and washed with methanol until free of sulphuric acid.

Found (percent): S, 14.5; N, 6.3. $C_{19}H_{24}N_2S_2O_6$ requires (percent): S, 14.54; N, 6.36.

EXAMPLE 2

132.8 parts of 9,9-di-(3'-aminopropyl) - fluorene - 2,7-disulphonic acid and 24.14 parts of sodium hydroxide are dissolved in 1,000 parts of water, and the solution added to an autoclave containing 8,000 parts of hexamethylene diammonium adipate, 44.1 parts of adipic acid 9.16 parts of acetic acid and 20.7 parts of titanium dioxide. The mixture is stirred and heated to 205° C. during 1 hour reaching a pressure of 250-lb./sq. in. The temperature is then raised to 240° C. during 1 hour whilst the pressure is maintained (by a spring-loaded escape valve). During the next (third) hour the pressure is allowed to fall to one atmosphere while the temperature is raised further to 275° C.; the polymer is finally heated at 285° C. for 35 minutes.

The resulting white polymer which possesses a Relative Viscosity of 33.4 is melt-spun under steam to give a yarn of 20 filaments. The latter are drawn to 3.66 times their original length and then have a total denier of 70 and 30% extensibility at break.

The Relative Viscosity is determined by dividing the viscosity of an 8.4% w./w. solution of the polymer in 90% w./w. aqueous formic acid at 25° C. by the viscosity of the said aqueous formic acid at the same temperature.

The yarn on analysis proved to have 49 gm. eqts. of amine ends and 71 gm. eqts. of carboxyl ends per million gms.; the Relative Viscosity is 34.5.

A hank of yarn is immersed for 3 hrs. in 200 times its weight of a 0.05% aqueous solution of Acid Blue No. 45 containing 1% of acetic acid, but is hardly stained. The amount of dyestuff taken up, equivalent dye uptake (E.D.U.), is measured by dissolving 50 mg. of the yarn in 20 ml. of 40% sulphuric acid and measuring the optical density at 430 m$\mu$ in a Unicam S.P. 600 spectrophotometer. The dyestuff taken up by polyhexamethylene adipamide yarn under the same conditions is 30 times as much.

At a pH of 5.6 the yarn possessed an E.D.U. of Basic Orange 28 (Colour Index) 5.22 times that of polyhexamethylene adipamide yarn whilst at pH 7.0 the E.D.U. was 3.23 times that of polyhexamethylene adipamide yarn.

EXAMPLE 3

7930 parts of caprolactam, a solution of 154.7 parts of 9,9-di(3'-aminopropyl)-fluorene - 2, 7 - disulphonic acid, 28.12 parts of sodium hydroxide in 3 litres of water, and 51.32 parts of adipic acid is added to an autoclave under an atmosphere of nitrogen. The temperature is raised during one hour to 220° C. and the steam pressure to 250 p.s.i.g.; during the next hour the temperature is raised to 270° C. and steam allowed to escape slowly reducing the pressure to 180 p.s.i.g.; while during the next hour the temperature is raised to 285° C. and the pressure allowed to fall to atmospheric. The molten polymer is held to 285° C. for 45 minutes under an atmosphere of steam before being extruded into a ribbon.

The resulting polymer has a Relative Viscosity of 30.1, an amine end group of 51.6 g./$10^6$ g. and a carboxyl end group content of 54. g./$10^6$ g.

This polymer is spun at 270° C. to a 20 filament yarn of 400 denier. The yarn, after drawing at a draw ratio of 3.31, has a denier of 114 and an extension at break of 40%.

At a pH of 3.7 the yarn possesses an E.D.U. of Acid Blue 45 (Colour Index) of 1/60 of that of a polycaproamide yarn under similar conditions. At a pH of 3.0 the E.D.U. of the yarn to Basic Orange 28 (Colour Index) was 12.5 times that of the polycaproamide yarn.

EXAMPLE 4

7543 parts of hexamethylene diammonium dodecamethylene dioate, a solution of 96 parts of 9,9-di(3'-aminopropyl)-fluorene - 2,7 - disulphonic acid and 17.44 parts of sodium hydroxide in 2 litres of water and 31.84 parts of adipic acid is added to an autoclave, under an atmosphere of nitrogen. Polymerisation is effected as described in Example 3 to produce a white polymer having an amine end group content of 65.2 g./$10^6$ g. and a carboxyl content of 54 g./$10^6$ g.

This polymer is melt spun under an atmosphere of steam at 270° C. to a 20 filament yarn of 260 denier. After drawing at a draw ratio of 3.3 the yarn has a denier of 74.5 and an extension at break of 19%.

At a pH of 3.7 the yarn possesses an E.D.U. of Acid Blue 45 (Colour Index) 1/28 of polyhexamethylene dodecamethylene diamide. At a pH of 3.0 the E.D.U. of the yarn to Basic Orange 28 (Colour Index) is 9 times that of the polyhexamethylene dodecamethylene diamide yarn.

What I claim is:

1. A compound selected from the group consisting of 9,9-bis-amino alkyl fluorene 2-sulphonic acid and 9,9-bis-amino alkyl fluorene 2,7-disulphonic acid in which the alkyl group contains from 1–17 carbon atoms.
2. A compound according to claim 1 wherein the alkyl group is methyl, ethyl, isobutyl or stearyl.
3. The sulpho - 9,9 - bis-aminoalkylfluorene of claim 1 wherein the aminoalkyl group is gamma-amino-n-propyl.
4. 9,9 - di(3' - aminopropyl) - fluorene 2,7-disulphonic acid.
5. The alkali metal salts of a compound according to claim 1.
6. The salts according to claim 5 wherein the monovalent metal is sodium or potassium.

References Cited

Van et al.: Chemical Abstracts, 38, 3276 (1944).

DANIEL D. HORWITZ, Primary Examiner

U.S. Cl. X.R.

260—78. 823